United States Patent
Reidlinger et al.

(10) Patent No.: US 8,372,914 B2
(45) Date of Patent: Feb. 12, 2013

(54) URETHANE MODIFIED WATER-REDUCIBLE ALKYD RESINS

(75) Inventors: Gerhard Reidlinger, Graz (AT); Edmund Urbano, Graz (AT); Ewald Zrin, Graz (AT); Manfred Gogg, Lieboch (AT); Johannes Scherz, Wundschuh (AT)

(73) Assignee: Cytec Surface Specialties Austria GmbH (AT)

( * ) Notice: Subject to any disclaimer, the term of this patent is extended or adjusted under 35 U.S.C. 154(b) by 953 days.

(21) Appl. No.: 11/817,246

(22) PCT Filed: Feb. 20, 2006

(86) PCT No.: PCT/EP2006/001503
§ 371 (c)(1),
(2), (4) Date: Jan. 15, 2008

(87) PCT Pub. No.: WO2006/092211
PCT Pub. Date: Sep. 8, 2006

(65) Prior Publication Data
US 2008/0319141 A1 Dec. 25, 2008

(30) Foreign Application Priority Data
Mar. 2, 2005 (EP) .................................... 05004547

(51) Int. Cl.
*C08F 8/00* (2006.01)

(52) U.S. Cl. ......... 525/131; 525/123; 525/126; 525/130; 525/440.01; 525/440.14; 525/440.15; 525/440.16; 525/453; 525/454; 525/455

(58) Field of Classification Search .................. 525/123, 525/130, 126, 131, 440.01, 440.14, 440.15, 525/440.16, 453, 454, 455
See application file for complete search history.

(56) References Cited

U.S. PATENT DOCUMENTS

| 5,698,625 | A | * | 12/1997 | Billiani et al. | ................. | 524/513 |
| 6,319,981 | B1 | * | 11/2001 | Dhein et al. | ................... | 524/591 |
| 7,141,625 | B2 | * | 11/2006 | Komazaki et al. | ............. | 524/539 |
| 2006/0194922 | A1 | * | 8/2006 | Reidlinger et al. | ............ | 525/127 |

FOREIGN PATENT DOCUMENTS

| EP | 0 267 562 A2 | 5/1988 |
| EP | 0295403 A2 | 12/1988 |
| EP | 0 437 743 A2 | 7/1991 |
| EP | 437743 A2 * | 7/1991 |
| EP | 0758365 A1 | 2/1997 |
| JP | 57192433 A * | 11/1982 |
| WO | WO 2005/012370 A1 * | 2/2005 |

* cited by examiner

*Primary Examiner* — Michael L Leonard
(74) *Attorney, Agent, or Firm* — Connolly Bove Lodge & Hutz LLP

(57) ABSTRACT

Urethane modified water-reducible alkyd resins ABCD, comprising moieties derived from polyhydric alcohols A, modified fatty acids B made by grafting olefinically unsaturated carboxylic acids B2 onto fatty acids B1, ungrafted fatty acids C and polyfunctional isocyanates D, a process for their production, and a method of use thereof in coating binders

8 Claims, No Drawings

URETHANE MODIFIED WATER-REDUCIBLE ALKYD RESINS

RELATED APPLICATIONS

This application is a national stage application (under 35 U.S.C. 371) of PCT/EP2006001503 filed Feb. 20, 2006, which claims benefit of European application 05004547.7 filed Mar. 2, 2005.

The present invention relates to urethane modified water-reducible alkyd resins.

Allkyd resins may be rendered water-reducible by grafting with olefinically unsaturated carboxylic acids, especially alpha-unsaturated carboxylic acids like methacrylic acid or by cocondensation with polycarboxylic acids such as tetrahydrophthalic acid or hydroxycarboxylic acids having acid groups which do not react, or only react to a small extent, under polycondensation conditions by esterification, yet impart hydrophilicity after being neutralised with alkaline compounds to provide a sufficient number of anionic groups in the resin molecules.

Water-reducible alkyd resins where fatty acids bearing grafts derived from acrylic monomers have been known, i. a. from EP-A 0 267 562, EP-A 0 295 403, and EP-A 0 758 365. The maximum value of mass fraction of solids realised with the technology described therein was approximately 45%. There is also a connection between the maximum mass fraction of solids and the degree of hydrophilic modification. A lower degree of hydrophilic modification allows a higher mass fraction of solids and improves the water and humidity resistance of the paint film, on the other hand impairs the dispersibility of the alkyd resin in water and reduces the stability of the dispersion.

When grafting olefinically unsaturated carboxylic acids onto a preformed alkyd resin, moieties derived from unsaturated fatty acids ("drying fatty acids") are attacked preferentially which impairs the drying behaviour of the resin. Cocondensation during the formation of the polyester with compounds having a functionality in excess of 2 is basically feasible, yet this may lead to the formation of branched polymers that have high viscosities and therefore need to be diluted using more solvent in order to yield resin solutions which are still easily processable.

There is a need, therefore, for water reducible alkyd resins which can be tailored in hydrophilicity and drying behaviour according to the application envisaged, as well as to provide an adapted process for the synthesis of such alkyd resins.

During the experiments that have led to the present invention, it has been found that grafted fatty acids B can selectively be esterified with polyhydric alcohols A so that the carboxylic acid group of the graft acids B2 remains unesterified. These grafted fatty acids B are made by grafting olefinically unsaturated carboxylic acids B2 which preferentially carry substituents on the carbon atom in alpha position to the carboxyl group, such as methacrylic acid, ethacrylic acid (2-methylene butanoic acid or 2-ethyl acrylic acid), 2-vinyl propionic acid and tiglinic acid (trans-2,3-dimethyl acrylic acid) onto fatty acids B1.

By addition of further (semi-drying or drying) fatty acids C to the grafted fatty acids B, and proper selection of the composition of the alcohol mixture, the drying behaviour of the hydroxy functional intermediate ABC obtained by polyesterification from A, B, and C is controlled by the composition of the fatty acid mixture, and branching is controlled by the functionality of the alcohols A. Esterification in the process to make the intermediate ABC is conducted in a way to remove the water formed by the reaction to an extent which corresponds to the number of acid groups which shall be esterified, leaving out, of course, those acid groups which are attached to the olefinically unsaturated carboxylic acids B2 forming the graft branches. This allows to selectively esterify only the acid groups of the fatty acids B1 and C, but not those of B2.

Surprisingly, it has been found that the hydroxy functional intermediates ABC can be reacted with a polyfunctional isocyanate D, without addition of a solvent, where only the hydroxyl groups are added to the isocyanate groups under formation of a urethane bond, without decarboxylation occurring by reaction of isocyanates with the residual carboxylic acid groups in ABC.

The invention therefore relates to urethane modified water-reducible alkyd resins ABCD, comprising moieties derived from polyhydric alcohols A, modified fatty acids B made by grafting olefinically unsaturated carboxylic acids B2 onto fatty acids B1, ungrafted fatty acids C and polyfunctional isocyanates D.

In another embodiment of the invention, it is also possible to react the intermediate ABC with a dicarboxylic or tricarboxylic acid E or an anhydride thereof such as phthalic anhydride or trimellithic anhydride, tetrahydrophthalic acid anhydride, maleic anhydride, adipic acid, malonic acid, oxalic acid, and succinic acid or its anhydride, in order to increase its molar mass before reaction with the polyfunctional isocyanate D, yielding a product ABCDE.

The invention further relates to a process for the synthesis of urethane modified water-reducible alkyd resins ABCD and ABCDE, comprising moieties derived from polyhydric alcohols A, modified fatty acids B made by grafting olefinically unsaturated carboxylic acids B2 onto fatty acids B1, ungrafted fatty acids C, optionally, di- or tricarboxylic acids E or anhydrides thereof, and polyfunctional isocyanates D. For the sake of simplicity, products ABCDE will be comprised by mention of products ABCD hereinafter.

According to this process, in a first step, fatty acids B1 are grafted with olefinically unsaturated carboxylic acids B2 which preferably carry, in the alpha position relative to the carboxyl group, a substituent selected from the group consisting of linear, branched, and cyclic alkyl radicals having from 1 to 8 carbon atoms, and aryl radicals having from 5 to 10 carbon atoms which may optionally be substituted with one of the alkyl radicals mentioned supra. In the grafting step, in addition to the acids B2, other olefinically unsaturated monomers B3 capable of radical copolymerisation may also be grafted onto the fatty acids B1, selected from the group consisting of olefinically unsaturated carboxylic acids B31 such as acrylic acid, monoesters B32 of aliphatic alcohols and olefinically unsaturated dicarboxylic acids such as monomethyl maleinate, esters B32 of aliphatic alcohols and the olefinically unsaturated carboxylic acids B31 such as methyl (meth)acrylate, ethyl (meth)acrylate, isobutyl (meth)acrylate, and 2-ethylhexyl(meth)acrylate, as well as diesters of olefinically unsaturated dicarboxylic acids such as dimethyl maleinate, hydroxy functional esters B33 of di- and polyhydric alcohols and the olefinically unsaturated carboxylic acids mentioned as B31, such as hydroxyethyl (meth)acrylate and hydroxypropyl (meth)acrylate, and aromatic vinyl compounds B34 such as styrene, p-methylstyrene and vinyl toluene, and other vinyl compounds B35 such as vinyl acetate, vinyl chloride, and (meth)acrylonitrile.

In the second step, the grafted fatty acids B are esterified with di- or polyhydric alcohols A and ungrafted fatty acids C which have a minimum content of olefinic double bonds of 1.97 mol/kg, corresponding to an iodine number of 50 cg/g, under removal of the water formed in the reaction. The amounts of substance and functionalities of the educts used are chosen such that the condensation products have an average hydroxyl functionality of at least 1.1, preferably from 1.5 to 3.0, and especially preferred, at least 1.9.

Optionally, the intermediate ABC is then reacted with a di- or tricarboxylic acid or its anhydride, E, under formation of $(ABC)_nE$ which again is hydroxy functional, and where n is 2 or 3.

In another embodiment of the invention, it is also possible to perform a transesterifcation of vegetable oils, such as soybean oil, sunflower oil, safflower oil, linseed oil, rapeseed oil, and cottonseed oil, which are esters of the fatty acids C, with the polyhydric alcohols A and esterifying the resulting monoesters of the polyhydric alcohols A with the grafted fatty acids B and further dicarboxylic or tricarboxylic acids E or anhydrides thereof in order to increase its molar mass, which process yields an intermediate $(ABC)_nE$.

In the third step, these hydroxy functional condensation products ABC or $(ABC)_nE$ are reacted with polyfunctional isocyanates D under polyaddition to form urethanes. Then, the remaining carboxyl groups of the adducts ABCD are at least partly neutralised and the neutralised adducts converted to the aqueous phase.

The di- or polyhydric alcohols A are aliphatic linear or branched alcohols having from 3 to 12 carbon atoms and at least two hydroxyl groups, such as ethylene glycol, 1,2- and 1,3-propylene glycol, 1,4-butane diol, 1,6-hexane diol, neopentyl glycol, diethylene glycol, dipropylene glycol, and other ether alcohols derived from these. Preferred polyhydric alcohols are glycerol, trimethylol ethane, trimethylol propane, diglycerol, ditrimethylol ethane and ditrimethylol propane, erythritol, pentaerythritol, dipentaerythritol and sugar alcohols such as sorbitol, mannitol, and arabitol.

The grafted fatty acids B are derived from fatty acids B1 grafted with olefinically unsaturated carboxylic acids B2, and optionally, further olefinically unsaturated monomers B3 as mentioned supra.

The fatty acids B1 according to the invention are at least mono-olefinically unsaturated aliphatic monocarboxylic acids, having from 4 to 24 carbon atoms. Among these unsaturated fatty acids, mention is made of lauroleic, myristoleic, palmitoleic, oleic, gadoleic, erucic, and ricinoleic acids, and of linoleic and linolenic acids. It is also possible to use mixtures of fatty acids prepared from vegetable oils such as soy bean oil fatty acid, linseed oil fatty acid, sunflower oil fatty acid, safflower oil fatty acid, rubber seed oil fatty acid and tall oil fatty acid.

The olefinically unsaturated carboxylic acids B2 preferably carry a substituent in alpha position with relation to the carboxyl group, which substituent is selected from the group consisting of linear, branched, and cyclic alkyl radicals having from 1 to 8 carbon atoms and of aryl radicals having from 5 to 10 carbon atoms which may additionally be substituted with the aforementioned alkyl radicals. It is further preferred that these acids have at least one free carboxyl group, particularly preferably not more than one carboxyl group. Examples of these acids are acrylic acid, methacrylic acid, vinyl acetic acid, crotonic and isocrotonic acid, the dicarboxylic acids maleic and fumaric acid, citraconic, mesaconic and itaconic acid, as well as their monoesters with linear, branched or cyclic alkanols having from 1 to 20 carbon atoms, particularly preferred are those monocarboxylic acids having a substituent in the alpha position such as methacrylic acid, ethacrylic acid, 2-vinyl propionic acid, and tiglinic acid. The most preferred acid is methacrylic acid. It is, however, also possible to use acrylic acid alone, or preferably, in mixture with methacrylic acid.

The ungrafted fatty acids C may be selected from the unsaturated fatty acids as cited under B1, and also from saturated fatty acids having from 6 to 30 carbon atoms such as caproic acid, caprylic acid, 2-ethyl hexanoic acid, capric acid, lauric acid, myristic acid, palmitic acid, stearic acid, arachidic acid, behenic acid, and lignoceric acid. Further, the fatty acids C may also be selected from mixtures of fatty acids which are based on naturally occurring fats, such as cotton seed oil fatty acid, peanut oil fatty acid, coconut oil fatty acid, linseed oil fatty acid, palm kernel oil fatty acid, olive oil fatty acid, palm oil fatty acid, castor oil fatty acid, rapeseed oil fatty acid, safflower oil fatty acid, soybean oil fatty acid, and tall oil fatty acid. It is likewise possible to use isomerised fatty acids where the double bonds are in conjugated position, such as isomerised polyunsaturated fatty acids made from sunflower oil or soy bean oil fatty acids (conjugated fatty acids).

The polyfunctional isocyanates D which are used according to the invention are selected from aromatic and aliphatic isocyanates, preferably diisocyanates, such as toluylene diisocyanate (TDI), bis-(4-isocyanatophenyl) methane (MDI), tetramethyl xylylene diisocyanate (TMXDI), bis-(4-isocyanatocyclohexyl) methane (HMDI), 1,6-diisocyanatohexane (HDI), and isophorone diisocyanate (IPDI). Mixtures of these may also be used.

The dicarboxylic or tricarboxylic acids E may be aliphatic linear, branched, or cyclic, and aromatic in nature, and may preferably be selected from the group consisting of phthalic acid, trimellithic acid, tetrahydrophthalic acid, maleic acid, adipic acid, malonic acid, oxalic acid, succinic acid, and the anhydrides thereof, to the extent that they exist.

In the process according to the invention, in the first step, fatty acids B1 or a mixture of such fatty acids are grafted with the olefinically unsaturated carboxylic acids B2, and optionally, monomers B3, in the presence of radical initiators, such as peroxides, at a temperature of from 80° C. to 160° C., optionally in solution. The increase in acid number which is effected by the graft procedure ranges approximately from an additional 80 mg/g to 250 mg/g, preferably from 100 mg/g to 150 mg/g.

The acid number is defined according to DIN EN ISO 2114 (formerly DIN 53 402) as the ratio of the mass $m_{KOH}$ of potassium hydroxide needed to neutralise the sample under analysis, and the mass $m_B$ of this sample (mass of the solids of the sample if this is a solution or dispersion); the customary unit is "mg/g".

In the second step, the grafted fatty acids B of the first step are esterified with polyhydric alcohols A and optionally, with ungrafted fatty acids C which have a minimum content of olefinic double bonds of 3.15 mol/kg, preferably at least 4.73 mol/kg, corresponding to an iodine number of at least 80 cg/g, preferably at least 120 cg/g, under removal of water formed in the reaction. The amounts of substance and functionalities of the educts used are preferably chosen such that the condensation products ABC have an average hydroxyl functionality of at least 1.9, preferably at least 2.0. In the case of the preferred trihydric alcohols, this corresponds to equal amounts of substance (the SI unit of which is "mol") of (monocarboxylic) fatty acids to trihydric alcohols. If additional (ungrafted) fatty acids C are added, 1 mol of trihydric alcohol must be added for each 1 mol of fatty acid, as an example.

In a further preferred embodiment, the monoesters of the trihydric alcohols may be mixed with diesters of tetrahydric alcohols or tetraesters of hexahydric alcohols. This allows to increase the amount of fatty acids introduced into the alkyd; if drying fatty acids are used herein, the oil length of the alkyd can be increased to from 40% up to 60%, without adversely affecting the hydrophilicity.

Optionally, the intermediates ABC can be reacted with a polybasic acid, preferably a di- or tri-functional acid, E, before the reaction with the isocyanate. This esterification is best effected with an acid anhydride, and optionally in the presence of catalysts such as titanium alkoxides because transesterification should be kept at a low level in this step. Catalysts that do not form coloured salts are preferred here. The number of carboxyl groups of component E added in this reaction should be a maximum of 50% of the number of hydroxyl groups in the intermediate ABC. This modification allows to limit the amount of urethane bonds in the final product, to a range of mass fraction of urethane groups (—O—CO—NH—) of from 1% to about 25%. A compound $(ABC)_nE$ is thereby formed which is hydroxy functional, and where n is 2 or 3. For the sake of brevity this is referred to as ABCE hereinbelow.

In the third step, the hydroxy functional condensation products ABC or ABCE are reacted with polyfunctional isocyanates D under polyaddition to form urethanes. As the hydroxy functional intermediates are oligomeric in nature, this can be effected in bulk, i. e. without addition of solvents. The reaction can be accelerated by increasing the temperature to not more than 120° C. It has been found that reaction temperatures higher than 130° C. facilitate the decarboxylation reaction occurring between the isocyanates and the carboxylic acid groups that have remained of the acids B2. On the other hand, temperatures of less than 70° C. are not recommended because the reaction rate is too low.

Then, the adduct ABCD or ABCED is neutralised and converted to the aqueous phase. This is done by using basic compounds such as alkali hydroxides, lithium hydroxide being preferred, and preferably with a volatile base, such as organic amines, or ammonia. It is possible to add the basic compound dissolved in water, to the reaction product ABCD or ABCED, and transfer the mixture into water; another possibility is to add the basic compounds to water and to feed the reaction product into the stirred aqueous solution of the said basic compound. The degree of neutralisation needed depends on the nature of the fatty acids and alcohols, as well as on the degree of grafting, and is preferably from 30% to 100%, particularly preferably from 50% to 85%. The degree of neutralisation is the ratio of neutralised acid groups (acid anions) to the total number of acid groups, neutralised and non-neutralised. Aqueous binder dispersions having a mass fraction of solids of from 35% to 55%, preferably from 40% to 50%, can be prepared by this technology.

The urethane modified grafted alkyds ABCD or ABCED according to the present invention offer a wider range of properties, because the polymer structure can be tailored to the application. Binders prepared from these resins can be used to prepare paints for a wide range of substrates from wood to leather, textiles, paper, and cardboard, and also metals and mineral substrates such as stone, concrete, or plaster. Coatings prepared with the alkyd resins of the present invention show good adhesion, high flexibility, fast drying, and little discolouration. At a given degree of hydrophilic modification, compared to earlier technologies, the resistance to water and humidity have been improved. The invention is further described in the Examples which are not intended to be limiting.

EXAMPLES

Example 1

71 g of linseed oil fatty acid were charged in a reactor and heated to 140° C. A monomer mixture consisting of 55 g of isobutyl methacrylate, 10 g of para methyl styrene and 35 g of methacrylic acid together with 4 g of di-tert. butyl peroxide were added continuously over eight hours. The mixture was kept at 140° C. thereafter until a conversion to polymer of at least 99% had been reached, as witnessed by the mass fraction of solids. Finally, the reaction mixture was diluted with xylene. The solution had a mass fraction of solids of 85%, and an acid number of 203 mg/g.

Example 2

71 g of linseed oil fatty acid were charged in a reactor and heated to 140° C. A monomer mixture consisting of 60 g of isobutyl methacrylate, 10 g of para methyl styrene and 30 g of acrylic acid together with 4 g of di-tert. butyl peroxide was added continuously over eight hours. The mixture was kept at 140° C. thereafter until a conversion to polymer of at least 99% had been reached, as witnessed by the mass fraction of solids. Finally, the reaction mixture was diluted with xylene. The solution had a mass fraction of solids of 85%, and an acid number of 210 mg/g.

Example 3

230 g of the grafted fatty acid of Example 2 were charged to a reactor, together with 67 g of trimethylol propane and 70 g of sunflower oil fatty acid, and heated to 175° C. The mixture was kept under esterification conditions at a constant temperature of 175° C. under removal of water by azeotropic distillation with xylene until an acid number of approximately 75 mg/g had been reached. All solvent was then removed by distillation under reduced pressure. Within thirty minutes, 30 g of toluylene diisocyanate were added at 70° C., the temperature slowly rising due to the exothermic reaction to 100° C. At this temperature, the reaction was continued until a Staudinger index of 8.5 cm$^3$/g had been reached. Additional diisocyanate was added if there was need, when repeating this experiment, care being taken that no residual free isocyanate was left after reaching the desired value of the Staudinger index. Then, the solid resin was emulsified by adding 580 ml of water and 15 g of an aqueous ammonia solution of 25% strength, yielding an aqueous emulsion of the binder with a mass fraction of solids of 37%, a dynamic viscosity measured at 23° C. and a shear rate of 10 s$^{-1}$ of 9500 mPa·s, an average particle size of 150 nm, an acid number of 70 mg/g, and a pH of 8.5, measured at 10% strength in water.

Example 4

200 g of the grafted fatty acid of Example 1 were charged to a reactor, together with 67 g of trimethylol propane, 15 g of isomerised sunflower oil fatty acid, and 55 g of native sunflower oil fatty acid, and heated to 175° C. The mixture was kept under esterification conditions at a constant temperature of 175° C. under removal of water by azeotropic distillation with xylene until an acid number of approximately 75 mg/g had been reached. All solvent was then removed by distillation under reduced pressure. Within thirty minutes, 60 g of isophorone diisocyanate were added at 70° C., the temperature slowly rising due to the exothermic reaction to 100° C. At this temperature, the reaction was continued until a Staudinger index of 8.5 cm$^3$/g had been reached. Additional diisocyanate was added if there was need, when repeating this experiment, care being taken that no residual free isocyanate was left after reaching the desired value of the Staudinger index. Then, the solid resin was emulsified by adding 480 ml of water and 15 g of an aqueous ammonia solution of 25% strength, yielding an aqueous emulsion of the binder with a mass fraction of solids of 42%, a dynamic viscosity measured at 23° C. and a shear rate of 10 s$^{-1}$ of 4500 mPa·s, an average particle size of 65 nm, an acid number of 55 mg/g, and a pH of 8.2, measured at 10% strength in water.

Example 5

200 g of the grafted fatty acid of Example 1 were charged to a reactor, together with 67 g of trimethylol propane, and 140 g of sunflower oil fatty acid, and heated to 175° C. The mixture was kept under esterification conditions at a constant temperature of 175° C. under removal of water by azeotropic distillation with xylene until an acid number of approximately 65 mg/g had been reached. All solvent was then removed by distillation under reduced pressure. Within thirty minutes, 55 g of toluylene diisocyanate were added at 70° C., the temperature slowly rising due to the exothermic reaction to 100° C. At this temperature, the reaction was continued until a Staudinger index of 8.5 cm$^3$/g had been reached. Additional diisocyanate was added if there was need, when repeating this experiment, care being taken that no residual free isocyanate was left after reaching the desired value of the Staudinger index. Then, the solid resin was emulsified by adding 610 ml of water and 15 g of an aqueous ammonia solution of 25% strength, yielding an aqueous emulsion of the binder with a mass fraction of solids of 40%, a dynamic viscosity measured at 23° C. and a shear rate of 10 s$^{-1}$ of 3500 mPa·s, an average particle size of 120 nm, an acid number of 52 mg/g, and a pH of 8.8, measured at 10% strength in water.

Example 6

200 g of the grafted fatty acid of Example 1 were charged to a reactor, together with 67 g of trimethylol propane, 15 g of isomerised sunflower fatty acid, and 55 g of native sunflower oil fatty acid, and heated to 175° C. The mixture was kept under esterification conditions at a constant temperature of 175° C. under removal of water by azeotropic distillation with xylene until an acid number of approximately 75 mg/g had been reached. All solvent was then removed by distillation under reduced pressure. Within thirty minutes, 30 g of isophorone diisocyanate were added at 70° C., the temperature slowly rising due to the exothermic reaction to 100° C. At this temperature, the reaction was continued until a Staudinger index of 8.5 cm$^3$/g had been reached. Additional diisocyanate was added if there was need, when repeating this experiment, care being taken that no residual free isocyanate was left after reaching the desired value of the Staudinger index. Then, the solid resin was emulsified by adding 490 ml of water and 15 g of an aqueous ammonia solution of 25% strength, yielding an aqueous emulsion of the binder with a mass fraction of solids of 40%, a dynamic viscosity measured at 23° C. and a shear rate of 10 s$^{-1}$ of 3800 mPa·s, an average particle size of 60 nm, an acid number of 60 mg/g, and a pH of 8.3, measured at 10% strength in water.

Example 7

200 g of the grafted fatty acid of Example 1 were charged to a reactor, together with 67 g of trimethylol propane, 15 g of isomerised sunflower oil fatty acid, and 55 g of native sunflower oil fatty acid, and heated to 175° C. The mixture was kept under esterification conditions at a constant temperature of 175° C. under removal of water by azeotropic distillation with xylene until an acid number of approximately 75 mg/g had been reached. All residual solvent was then removed by distillation under reduced pressure. Within thirty minutes, 55 g of toluylene diisocyanate were added at 70° C., the temperature slowly rising due to the exothermic reaction to 100° C. At this temperature, the reaction was continued until a Staudinger index of 8.5 cm$^3$/g had been reached. Additional diisocyanate was added if there was need, when repeating this experiment, care being taken that no residual free isocyanate was left after reaching the desired value of the Staudinger index. Then, the solid resin was emulsified by adding 470 ml of water in which 5 g of lithium hydroxide mono-hydrate had been dissolved, yielding an aqueous emulsion of the binder with a mass fraction of solids of 43%, a dynamic viscosity measured at 23° C. and a shear rate of 10 s$^{-1}$ of 5300 mPa·s, an average particle size of 53 nm, an acid number of 55 mg/g, and a pH of 8.3, measured at 10% strength in water.

Example 8

373 g of soy bean oil and 98 g of pentaerythritol were transesterified at 260° C. using 0.05 g of lithium hydroxide as a catalyst. When a sample was completely soluble in ethanol forming a single phase, the mixture was cooled to 180° C., 89 g of phthalic anhydride were added and esterification was continued at 225° C. until an acid number of 5 mg/g had been reached. Thereafter, 430 g of the grafted fatty acid of example 1 were added at 160° C., and the mixture was heated to 175° C. At this temperature, esterification was continued until an acid number of 62 mg/g was reached, the water formed being removed by azeotropic distillation with xylene. All residual solvent was then removed by distillation under reduced pressure. Within thirty minutes, 85 g of isophorone diisocyanate were added at 70° C., the temperature slowly rising due to the exothermic reaction to 100° C. At this temperature, the reaction was continued as in Example 4 until a Staudinger index of 9 cm$^3$/g had been reached. No residual free isocyanate was left after reaching this desired value of the Staudinger index. Then, the solid resin was emulsified by adding 1320 ml of water and 53 g of ammonia (25% strength solution in water), yielding an aqueous emulsion of the binder with a mass fraction of solids of 42%, a dynamic viscosity measured at 23° C. and a shear rate of 10 s$^{-1}$ of 8300 mPa·s, an average particle size of 120 nm, an acid number of 54 mg/g, and a pH of 8.3, measured at 10% strength in water.

Example 9

56 g of soy bean oil and 40 g of trimethylol propane were transesterified at 260° C. using 0.01 g of lithium hydroxide as a catalyst. When a sample was completely soluble in ethanol forming a single phase, the mixture was cooled to 180° C., 91 g of phthalic anhydride, 47 g of trimethylol propane and 23 g of benzoic acid were added and esterification was continued at 230° C. until an acid number of 3 mg/g had been reached. Thereafter, 202 g of the grafted fatty acid of example 1 were added at 160° C., and the mixture was heated to 175° C. At this temperature, esterification was continued until an acid number of 62 mg/g had been reached, the water formed being removed by azeotropic distillation with xylene. All residual solvent was then removed by distillation under reduced pressure. Within thirty minutes, 36 g of isophorone diisocyanate were added at 70° C., the temperature slowly rising due to the exothermic reaction to 100° C. At this temperature, the reaction was continued as in Example 4 until a Staudinger index of 10.5 cm$^3$/g had been reached. No residual free isocyanate was left after reaching this desired value of the Staudinger index. Then, the solid resin was emulsified by adding 617 ml of water and 23.7 g of ammonia (25% strength solution in water), yielding an aqueous emulsion of the binder with a mass fraction of solids of 40%, a dynamic viscosity measured at 23° C. and a shear rate of 10 s$^{-1}$ of 6600 mPa·s, an average particle size of 140 nm, an acid number of 57 mg/g, and a pH of 8.4, measured at 10% strength in water.

The invention claimed is:

1. Urethane modified water-reducible alkyd resins ABCD, comprising a reaction product of a polyfunctional isocyanate D with a hydroxy-functional intermediate ABC having an average hydroxyl functionality of at least 1.9 made by esterification from polyhydric alcohols A, from modified fatty acids B made by grafting olefinically unsaturated carboxylic acids B2 onto at least mono-olefinically unsaturated fatty acids B1, and from ungrafted fatty acids C, wherein the olefinically unsaturated carboxylic acids B2 carry a substituent in alpha position with relation to the carboxyl group, which substituent is selected from the group consisting of linear, branched, and cyclic alkyl radicals having from 1 to 8 carbon atoms and of aryl radicals having from 5 to 10 carbon atoms, and wherein the at least mono-olefinically unsaturated fatty acids B1 are selected from the group consisting of lauroleic acid, myristoleic acid, palmitoleic acid, oleic acid, gadoleic acid, erucic acid, linoleic acid, linolenic acid, soy bean oil fatty acid, linseed oil fatty acid, sunflower oil fatty acid, safflower oil fatty acid, rubber seed oil fatty acid, and tall oil fatty acid, wherein the olefinically unsaturated carboxylic acids B2 are selected from the group consisting of methacrylic acid, ethacrylic acid, 2-vinylpropionic acid, and tiglinic acid, and wherein the polyfunctional isocyanates D are selected from the group consisting of toluylene diisocyanate, bis-(4-isocyanatophenyl) methane, tetramethylxylylene diisocyanate, bis-(4-isocyanatocyclohexyl) methane, 1,6-diisocyanatohexane, isophorone diisocyanate, and mixtures of these.

2. The urethane modified water-reducible alkyd resins ABCD of claim 1, wherein the modified fatty acids are made by grafting the fatty acids B1 with the said olefinically unsaturated carboxylic acids B2, and additionally, with further olefinically unsaturated monomers B3 capable of radical copolymerisation which are selected from the group consisting of acrylic acid, methyl (meth)acrylate, ethyl (meth)acrylate, isobutyl (meth)acrylate, and 2-ethylhexyl (meth)acrylate, styrene, p-methylstyrene and vinyl toluene.

3. The urethane modified water-reducible alkyd resins ABCD of claim 1, wherein the ungrafted fatty acids C are selected from the group consisting of at least mono-olefinically unsaturated monocarboxylic acids having from 4 to 24 carbon atoms, and saturated fatty acids having from 6 to 30 carbon atoms, with the proviso that the ungrafted fatty acids C or a mixture thereof have a minimum content of double bonds of 3.15 mol/kg.

4. The urethane modified water-reducible alkyd resins ABCD of claim 1, wherein the mass fraction of urethane groups is from 1% to 25%, based on the mass of the resins ABCD.

5. The urethane modified water-reducible alkyd resins ABCD of claim 1, wherein the degree of neutralisation in an aqueous dispersion thereof is from 30% to 100%.

6. The urethane modified water-reducible alkyd resins ABCD of claim 1, wherein the olefinically unsaturated carboxylic acid B2 is selected from the group consisting of methacrylic acid, and ethacrylic acid.

7. A binder in paints useful for coating wood, leather, textile, paper, cardboard, metal, and mineral substrate which comprises the urethane modified alkyd resins of claim 1.

8. A method comprising preparing paints from the urethane modified alkyd resins of claim 1 and applying the said paints to substrates selected from the group consisting of wood, leather, textiles, paper, cardboard, metals, and mineral substrates.

* * * * *

UNITED STATES PATENT AND TRADEMARK OFFICE
CERTIFICATE OF CORRECTION

PATENT NO.        : 8,372,914 B2                                                       Page 1 of 1
APPLICATION NO. : 11/817246
DATED             : February 12, 2013
INVENTOR(S)       : Reidlinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1210 days.

Signed and Sealed this
First Day of September, 2015

Michelle K. Lee
*Director of the United States Patent and Trademark Office*